June 12, 1956  W. A. DONAHUE  2,749,606
APPARATUS AND METHOD FOR SECURING A NUT TO A SHEET MEMBER
Filed Nov. 9, 1951

Inventor
William A. Donahue
By Willits, Helmig & Baillio
Attorneys

United States Patent Office 2,749,606
Patented June 12, 1956

2,749,606

APPARATUS AND METHOD FOR SECURING A NUT TO A SHEET MEMBER

William A. Donahue, Detroit, Mich., assignor to General Motors Corporation, Detroit, Mich., a corporation of Delaware Application November 9, 1951, Serial No. 255,667

4 Claims. (Cl. 29—432)

This invention relates to a clinch nut assembly and a method for fabricating such assembly.

It is frequently necessary to secure relatively thin sheet or plate members together by means of a stud or a bolt. Such members are, however, frequently too thin to sustain threaded apertures of sufficient strength to retain a bolt or the like. In such a case a threaded member, such as a nut, is often secured to the sheet member and into which nut the fastening bolt can be threaded. A multitude of clinch nut assemblies have been designed to facilitate the joining of such members. Frequently the fabrication of such assemblies necessitates several individual steps, such as, punching an opening in a sheet or plate member, inserting a nut in or mounting it adjacent said opening and finally securing the nut to the member. The present invention includes a method and apparatus for incorporating the aforementioned steps into a single operation.

It is an object of the present invention to provide apparatus for quickly fabricated clinch nut assembly.

It is also an object of the present invention to provide a clinch nut assembly apparatus which includes means securing a nut having recesses intermediate its upper and lower faces to receive a sheet member.

In particular it is an object of this invention to provide an improved method for assembling a nut to a sheet or plate member.

It is also an object of this invention to provide a clinch nut assembly apparatus for securing a nut having head and shank portions with the shank having a reduced cross-section adjacent said head, to a sheet member.

It is a further object of the present invention to provide a method of assembling a nut to a plate which includes perforating the plate, positioning the nut within the perforation and locking the nut to the plate in a single operation.

In order to better understand the present invention, reference should be made to the following specification.

Figure 2:
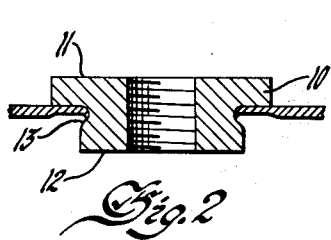
Figure 2 shows a clinch nut assembly which broadly embodies one phase of my invention.

The type of nut employed in the present clinch nut assembly may be formed from bar stock in any well-known manner. However, the cross-section of the nut itself is in this instance of particular concern. As shown in Figure 2 a nut such as that indicated at 10 to be usable with the present invention must as a minimum requirement embody a portion of reduced cross-section intermediate its upper and lower faces 11 and 12 and which reduced section is usually provided by a pair of recesses 13.

Figure 3:
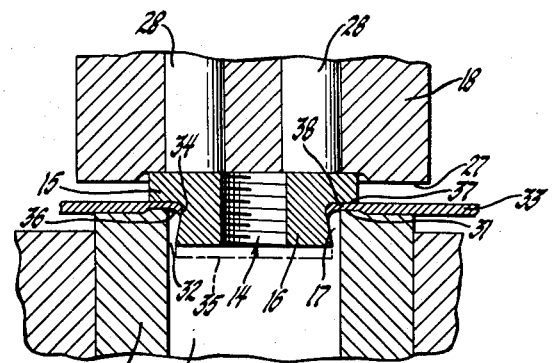
Figure 3 is a sectional view taken substantially along line 3—3 of Figure 1 illustrating in detail the apparatus for assembling a nut to a sheet member.
Figure 4:
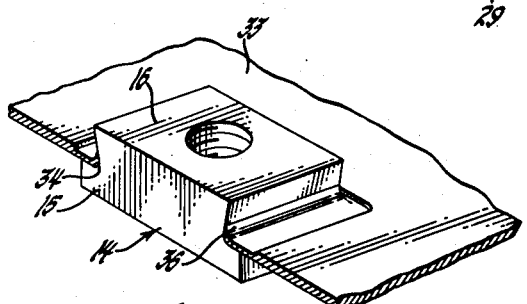
Figure 4 is an inverted perspective view of one form of clinch nut assembly formed by the apparatus of Figure 3.

A preferred form of clinch nut 14 is shown in Figures 3 and 4 and consists of a head portion 15 and a tapered shank 16. Shank 16 is tapered toward head 15 so as to provide recessed portions 17 adjacent said head. As will hereinafter be seen providing a nut having a portion of reduced cross-section intermediate its upper and lower faces is instrumental in insuring a secure locking engagement between the nut and the sheet or plate member.

Figure 1:
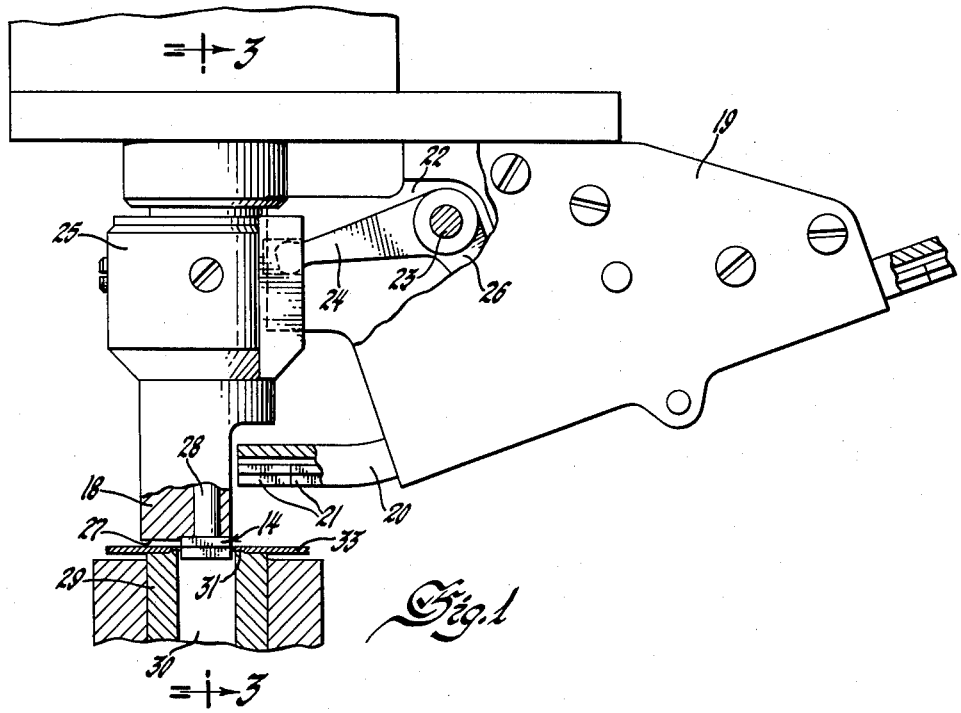
Figure 1 is a side elevation and partial section showing an apparatus for assembling a nut to sheet member.

Referring particularly to Figures 1 and 3, the nut 14 is shown carried by a punch member 18. The punch 18 is a part of an automatic nut loading machine 19 similar to that shown in Muchy 2,652,942, issued September 22, 1953. The nut loading machine will be referred but briefly to indicate how nuts may be continuously fed to the punch 18.

As may be seen in Figure 1, the nut loading machine 19 includes a slide 20 which slidably retains a column of nuts 21. As the punch 18 ascends a bell crank lever 22 pivoted at 23 is rotated in a clockwise direction through an arm 24 socketed to a collar 25 of the punch. The other arm 26 of the bell crank then engages the column of nuts, through a means not shown, so as to force the column 21 to the left such that the leftmost nut in the column is displaced under the now fully raised face 27 of the punch. The punch 18 contains a pair of magnets 28, one pair of ends of which are exposed on punch face 27. In this manner each nut is in turn magnetically retained upon the punch face 27 until the nut is secured to its respective plate member.

A die member 29 having an opening 30 therein is shown most clearly in Figure 3. It will be seen that die 29 has raised ledges 31 formed about opening 30. Also it is to be noted that the opening 30 is noticeably wider than the widest part of shank 16, thus providing a die clearance 32 between the die and shank, more about which clearance will be said later.

In the past, the various methods of making clinch nut assemblies have usually involved the steps of perforating a sheet or plate member by means of a tool, thereafter inserting the nut within the hole or perforation and in some manner securing the nut to the member. In the present invention the perforation of a sheet member, positioning of the nut and locking of the nut to the member are all achieved in a single pass or stroke of the punch 18.

The present invention utilizes the nut 14 itself as the punching or perforating member in such a manner that after a sheet member 33 has been pierced to provide a hole 34, the nut is in position within said hole for locking.

Normally in punching out a slug such as that shown at 35, the die and punch member are designed so as to cleanly shear off a slug substantially the size of the die opening. In the present invention, however, as the result of the die clearance 32 the slug 35 is appreciably smaller than the die opening 30 so that an excess of plate material 36 overlies the die opening 30. Thus when the shank 16 pierces the plate member 33 the excess material 36 is wiped under the tapered shank into the recesses 17 to insure locking the nut to the plate.

To obtain an even more secure locking engagement between nut 14 and plate 33, raised ledges 31, as noted, are formed about the die opening 30. As will be seen in Figure 3 the head portion 15 of nut 14 overlies the ledges 31. After the shank 16 has pierced plate 33, further downward travel of the nut compresses or spreads that portion 37 of the plate 33 disposed between the head 15 of the nut and the ledges 31. By so compressing or forging the plate and due to the inclined shape of the ledges, portion 38 and excess material 36 are laterally displaced so as to force the latter tightly against the shank 16 within the recessed portions 17 thereof. Since the shank 16 is downwardly diverging below the plate it becomes virtually impossible to withdraw the nut from the plate.

As seen in Figure 4, the clinch nut assembly as formed above is simply and durably made.

The clinch nut assembly shown in Figure 2 is fabricated in the same manner and by the same apparatus described in relation to Figures 1 and 3.

While various embodiments of the present invention have been shown and described, it is apparent that other structural modifications may be made within the scope of my invention.

I claim:

1. The method of attaching to a sheet member a nut having a portion of reduced cross-section intermediate its upper and lower faces which includes the steps of piercing said member with said nut, compressing that portion of said member adjacent said nut such that said member projects laterally within the reduced portion of said nut, and forming said adjacent portion of said member towards the lower of said nut faces so as to clinchingly engage said nut to said member.

2. The method of attaching to a plate a nut having a head and a shank which includes placing said plate over a die having an opening the cross-sectional area of which is substantially larger than that of said shank and raised ledges disposed about said opening, perforating said plate with said shank such that part of said plate overlies said die opening and compressing said plate between said head and said ledges whereby said plate is displaced laterally against said shank, and simultaneously bending the edges of said plate forming said opening away from said head so as to lock said nut to said plate.

3. The method of attaching to a plate a nut having a head portion and a tapered shank portion which includes placing said plate over a die having an opening the cross-sectional area of which is larger than the largest cross-section of said shank and a plurality of vertical protuberances disposed peripherally about said opening, piercing said plate with said shank such that the latter projects into said opening and compressing said plate between said head and said protuberances whereby portions of said plate are displaced laterally against said shank so as to engage the latter about its minimum cross-sectional area, and simultaneously forming said portions of said plate engaging said shank in a direction away from said head.

4. An apparatus for attaching to a sheet member a nut having a head portion and a shank tapered inwardly towards said head, which apparatus includes a punch adapted to have said nut removably secured thereto with said shank extending downwardly, a die having an opening formed therein and disposed beneath said punch, said die including a projection formed about said opening and adapted to receive said sheet member thereover, said punch being adapted to force said shank through said sheet member and into said die opening, said projection compressing said sheet member against said head and spreading said sheet laterally against the tapered end of said shank adjacent said head and forming the edges of said sheet member over the end of said die therebetween for locking said sheet member to said nut.

References Cited in the file of this patent

UNITED STATES PATENTS

| | | |
|---|---|---|
| 210,476 | Trageser | Dec. 3, 1878 |
| 513,655 | Schoen | Jan. 30, 1894 |
| 521,825 | Shipe | June 26, 1894 |
| 1,232,532 | Griffith | July 10, 1917 |
| 1,249,948 | Gruber | Dec. 11, 1917 |
| 1,252,289 | Murray | Jan. 1, 1918 |
| 1,397,020 | Smith | Nov. 15, 1921 |
| 1,531,492 | Marquardt | Mar. 31, 1925 |
| 1,919,552 | Hasselquist | July 25, 1933 |
| 1,928,653 | McEvoy et al. | Oct. 3, 1933 |
| 2,018,683 | Meyer | Oct. 29, 1935 |
| 2,029,341 | Sample | Feb. 4, 1936 |
| 2,120,711 | Phillips | June 14, 1938 |
| 2,139,590 | Jessop | Dec. 6, 1938 |
| 2,177,191 | Sandberg | Oct. 24, 1939 |
| 2,236,180 | Kost | Mar. 25, 1941 |
| 2,308,471 | Schwartz | Jan. 12, 1943 |
| 2,443,582 | Lendo | June 15, 1948 |
| 2,486,769 | Watson | Nov. 1, 1949 |